Figure 1:
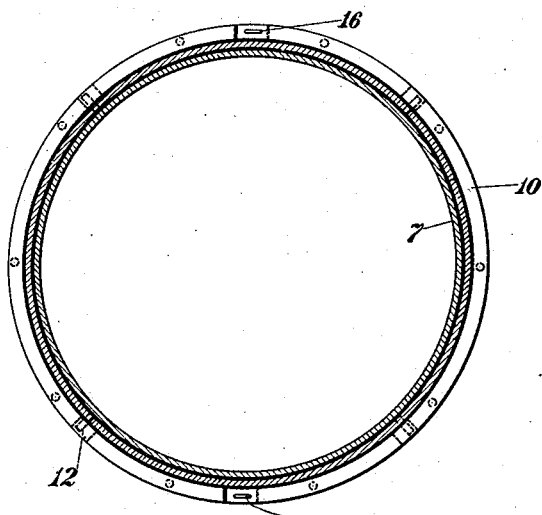

July 14, 1931.　　　S. L. HANDFORTH　　　1,814,597

GAUZE OR SCREEN CATALYST HOLDER OR SUPPORT

Filed July 12, 1929

Inventor
S. L. Handforth.
By his attorney

Patented July 14, 1931

1,814,597

UNITED STATES PATENT OFFICE

STANLEY L. HANDFORTH, OF WOODBURY NEW JERSEY, ASSIGNOR TO E. I. DU PONT DE NEMOURS & COMPANY, OF WILMINGTON, DELAWARE, A CORPORATION OF DELAWARE

GAUZE OR SCREEN CATALYST HOLDER OR SUPPORT

Application filed July 12, 1929. Serial No. 377,666.

This invention relates to a holder or support for a catalyst and more particularly to a holder or support for the contact, or catalyst, screen or gauze used in ammonia oxidation apparatus of the general broad type disclosed in U. S. Patent 1,321,376, to Jones and Parsons, November 11, 1919.

In the type of apparatus disclosed by Jones and Parsons a catalyst screen is placed within a converter chamber and ammonia and air are passed into the chamber and, upon contact with the catalyst, the ammonia is oxidized into oxides of nitrogen. The present invention, while not restricted thereto, has particular application to holders or supports for such screens.

In the practice of the Jones and Parsons process, the screen and its holder are subjected to a high temperature with resulting rapid deterioration of the holder if made of the ordinary materials. Also most metals at this elevated temperature act catalytically on a mixture of ammonia and air and cause oxidation of ammonia to free nitrogen with resulting loss in yield of the final product. There is the further disadvantage that the gauze or screen at this elevated temperature is so weak that the strain caused by the gas passing through it is sufficient to cause rupture unless special precautions are taken to support the gauze and reduce this strain. According to my invention a holder of such character has been devised that these disadvantages are substantially overcome.

An object of this invention is a holder or support for a screen or for the catalyst suitable for use in the oxidation of ammonia. A further object of my invention is a support of this kind capable of withstanding high temperatures. A still further object of my invention is a catalyst holder or support constructed of material that will not give up free nitrogen or otherwise reduce the yield of oxidation products. Another object of my invention is a catalyst or screen support or holder that will reduce the strain on the catalyst or screen itself. Other objects will appear as the description proceeds.

These objects are accomplished by the following invention in which I have found that a catalyst support or holder constructed of certain new alloys will withstand the conditions of operation in the oxidation of gases without deterioration. Furthermore, when such a holder is constructed so as to support the cylindrical gauze or screen at both ends and at a sufficient number of points along the sides of the cylinder, the strain on the catalyst itself under the conditions of operation may be relieved. Also, I have found that when all metal elements of the support are placed out of the stream of the gases to be oxidized that greater yield of the desired products results.

The following example is illustrative of one form of my invention as applied to the oxidation of ammonia-air gases, but it will be apparent that other modifications exist, and may be practiced, and that my invention may be applicable to the handling of other gases or mixtures.

Figure 2:
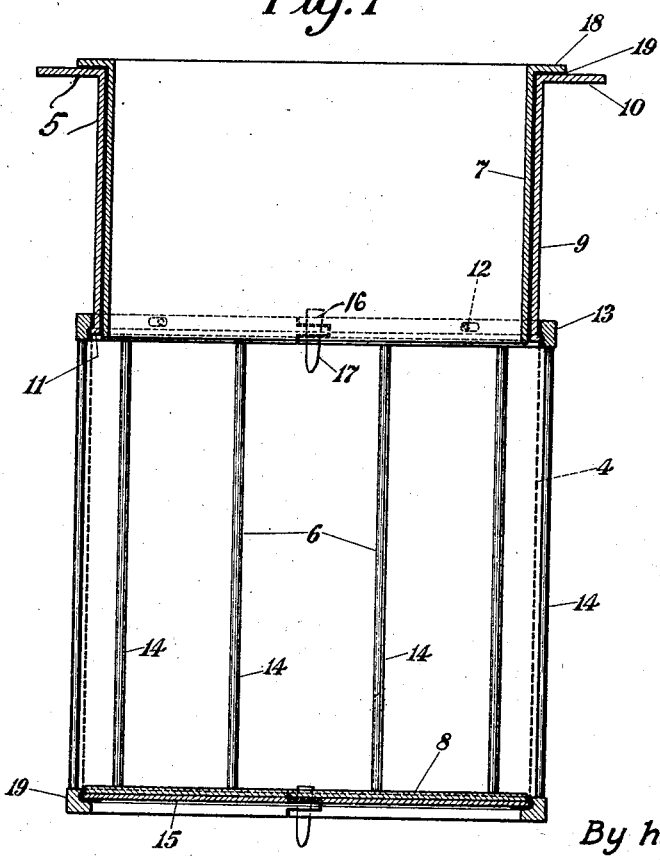

In the accompanying drawings Figure 1 is a sectional plan view of the assembly embodying the invention. Figure 2 is a vertical diametrical section of the same showing the method of assembling the supporting cage. Referring now to Figure 2, the apparatus in general comprises a catalyst screen 4, screen holder 5, clamping and supporting cage 6, and silica linings 7 and 8. The screen in the case of ammonia oxidation is preferably of platinum alloy gauze or equivalent thereof, cylindrical in shape and formed of any desired number of layers of material. In operation, a suitable mixture of air and ammonia is introduced into the interior of the screen 4, and in passing through the screen the ammonia is converted into oxides of nitrogen. The holder 5 comprises the depending, supporting cylindrical shell or sleeve 9 having the flange 10 adapted to be bolted to the top of the oxidation chamber (not shown), or between the flanges of the inlet pipe and the chamber. The periphery of the lower rim 11 of the shell 9 is formed with a slight bead on its outer edge as indicated at 11 in Figure 2. Also, studs 12 on the outer surface of the shell are provided near the lower end. The supporting cage 6 is composed of an upper ring 13 and a lower ring 19 connected by vertical rods 14. The upper ring of the cage is grooved so as to mate with the bead on the supporting shell 9 as shown. Holes are also provided in this ring to mate with studs 12. The gauze or screen is then held between the bead and groove as shown in the drawings. The lower ring of the cage is grooved so as to mate with the edge of plate 15 which closes the end of the cage and also clamps the gauze or screen. The rings of the cage are jointed by tongue and groove joints so that the cage may be separated in two or more vertical sections to facilitate its being removed and for convenience of assembly on the sleeve.

Through the tongue and groove joint as shown in Figure 2 there is a tapered slot 16 through which a tapered wedge 17 is inserted to draw the rings of the cage up tightly on the supporting sleeve and bottom plate, thus clamping the whole assembly together and fastening the gauze firmly at both ends. It will be apparent that all but one of these joints in each ring may be made as a hinge joint without altering the operation of the holder, and that similar modifications are within the purview of my invention. The pins 12 on shell 9 support the cage and effectively prevent its separating from the cylindrical shell. Rods 14 besides connecting the lower ring to the body of the holder also support the cylindrical gauze from being forced out laterally by the outflowing gases. The sections are preferably fastened together by the wedging means as shown. Lugs and bolts may be used in place of these, but, due to the high temperature to which these elements are subjected, bolts are often unsatisfactory; also, there is often not sufficient space for bolts at this point.

The supporting cylindrical shell 9 may be and preferably is further lined with a non-metallic inner sleeve or lining 7 which prevents contact of the incoming gas stream with the hot metal surfaces of the shell 9. This may have on its upper end a flange 18 on which it hangs, and asbestos or other suitable material 19 may be laid under the edge of this flange to prevent the gas passing between the lining and the supporting sleeve. With a lining of this type the temperature of the surface in contact with the incoming gas is appreciably lower than that of a bare supporting sleeve which greatly reduces the danger of loss of ammonia on this surface. The plate 15 closing the bottom of the cylinder is covered by a non-metallic plate 8. Thus the incoming gas stream is entirely prevented from coming in contact with hot metal surfaces which might cause loss of ammonia.

While three sections of the support or cage are preferable, it will be apparent that two or even more than three sections may be provided within the scope of my invention.

Most metals will not withstand the conditions to which this holder is normally subjected. I have found, however, that an alloy comprising 80% nickel and 20% chromium withstands these conditions and may be used without appreciable loss from deterioration. An alloy comprising approximately 65% nickel, 15% chromium and 20% iron also withstands these conditions and may be used for parts of this holder. Iron, however, is in many cases a serious poison to the gauze catalyst and in such instances I preferably use the alloy containing no iron for the parts of the supporting cage. These same alloys being resistant to the corrosive conditions and having only very slight deleterious catalytic action can be used advantageously for supporting other types of catalysts such as base metal oxide catalyst.

While a cylindrical holder has been particularly described to accommodate a cylindrical screen or gauze, it will, of course, be understood that holders or supports of other shapes may be used if desired to correspond to the design or shape of the screen or gauze selected.

As many apparently widely different embodiments of this invention may be made without departing from the spirit thereof, it is to be understood that I do not limit myself to the foregoing examples or description except as indicated in the following claims:

I claim:

1. In a screen holder, in combination, a sleeve or shell, and a clamping and supporting cage for the screen, adapted at its upper edge to engage the lower edge of the sleeve or shell.

2. In a screen holder, in combination, a sleeve or shell having supporting means at one end and engaging means at the other end, and a clamping and supporting cage having a grooved ring around its upper edge adapted to engage the engaging means and the edge of the screen to be supported thereby.

3. The apparatus of claim 1 in which the metallic elements comprise an alloy of at least 60 per cent nickel and at least 15 per cent chromium.

4. The apparatus of claim 2 in which the metallic elements comprise an alloy of approximately 80 per cent nickel and 20 per cent chromium.

5. In a screen holder, in combination, a sleeve or shell having supporting means at one end and engaging means at the other, of a clamping and supporting cage comprising rings adapted to engage and support the screen, one of the rings also adapted to engage the sleeve or shell, and spacing members connecting the rings.

6. In a screen holder and support, in combination, a sleeve or shell having supporting means at one end and a bead at the other, a clamping and supporting cage for the screen and adapted to engage the bead.

7. In a screen holder and support, in combination, a sleeve or shell having supporting means at one end and a bead at the other, a clamping and supporting cage for the screen and adapted to engage the bead, and studs on the shell for engaging and supporting the ring.

8. In a screen holder and support, in combination, a sleeve or shell, a clamping and supporting cage for the screen and a plate closing the outer end of the cage member.

9. In a screen holder and support, in combination, a sleeve or shell adapted to be connected to an oxidation chamber a non-metallic inner sleeve for the shell, a bead surrounding the lower edge of the shell, a cage for supporting the screen and adapted to engage the upper edge of the screen and the bead, the cage having a closing plate at its outer end and a non-metallic lining for the closing plate.

10. In a screen holder and support, in combination, a sleeve or shell adapted to be connected to an oxidation chamber, a non-metallic inner sleeve for the shell, spaced studs on the shell, a cage for supporting the screen and comprising at least two sections, holes in the upper edge of the sections for engaging the studs and adapted to support the cage, a bead surrounding the lower edge of the shell and adapted to engage the upper edge of the screen, the cage having a closing plate at its outer end.

11. A screen support in the form of a cage adapted to be separated therefrom, the end members of the cage adapted to clamp the screen or gauze to the supporting means and spacing members connecting the end and adapted to support the screen.

12. A gauze or screen holder or support comprising a cylindrical cage adapted to be separated into at least two sections for convenience in assembly, and adapted when assembled to enclose a cylindrical gauze or screen and engage a supporting means at one end, and a closing plate at the other end.

13. A gauze or screen holder and support, in combination, a cylindrical cage comprising two rings separable into at least two parts, one ring adapted to mate with and engage a bead and supporting stud of a cylindrical open ended supporting shell, and another ring adapted to mate with and engage a closing plate, the rings also adapted to enclose and engage a cylindrical gauze, spacing members connecting the two rings and supporting the rings and plate and the cylindrical screen.

In testimony whereof, I affix my signature.

STANLEY L. HANDFORTH.